United States Patent
Chang et al.

[11] Patent Number: 6,161,966
[45] Date of Patent: Dec. 19, 2000

[54] MULTI-BLADE LENS-APERTURE CONTROL MECHANISM

[75] Inventors: Guang-Shang Chang, Taichung; Jian-Ming Peng, Hsinchu; Chien-Chin Chan, Hsinchu Hsien, all of Taiwan

[73] Assignee: UMAX Data Systems Inc., Hsinchu, Taiwan

[21] Appl. No.: 09/340,733

[22] Filed: Jun. 29, 1999

[30] Foreign Application Priority Data

Jan. 14, 1999 [TW] Taiwan .................................. 88200565

[51] Int. Cl.$^7$ ................................ G03B 9/02; G02B 9/00
[52] U.S. Cl. .......................... 396/508; 396/510; 359/739
[58] Field of Search ................................... 396/510, 505, 396/508; 359/739, 740, 233, 234

[56] References Cited

U.S. PATENT DOCUMENTS

| | | | |
|---|---|---|---|
| 4,030,825 | 6/1977 | Ghougasian | 396/505 X |
| 5,765,060 | 6/1998 | Shimizu | 396/508 X |
| 5,809,357 | 9/1998 | Hamasaki | 396/508 X |

*Primary Examiner*—W. B. Perkey
*Attorney, Agent, or Firm*—Smith, Gambrell & Russell, LLP

[57] ABSTRACT

A lens-aperture control mechanism is provided for use in a lens unit to control the aperture of the lens unit. The lens-aperture control mechanism includes a plurality of blades, each being movable radially inward into the lens barrel and outward from the lens barrel; a rotatable ring coupled to the blades, capable of urging the blades to move radially inward into the lens barrel when being turned in a first direction and outward from the lens barrel when being turned in a second direction; and a power driver for driving the rotatable ring to turn in a specified direction by a specified angular displacement so as to move the blades to a specific radial position to define a specific aperture for the lens unit. The inner end of each of the blades is formed in a concave shape or a curved haft-cutaway portion. When combined, the inner ends of the blades can define a near-circular aperture for the lens unit. This lens-aperture control mechanism can variably control the lens aperture to the desired value and can provide a near-circular aperture for the lens. Moreover, the lens-aperture control mechanism, being simple in mechanical construction, is easy to assemble and thus low in manufacture cost.

7 Claims, 7 Drawing Sheets

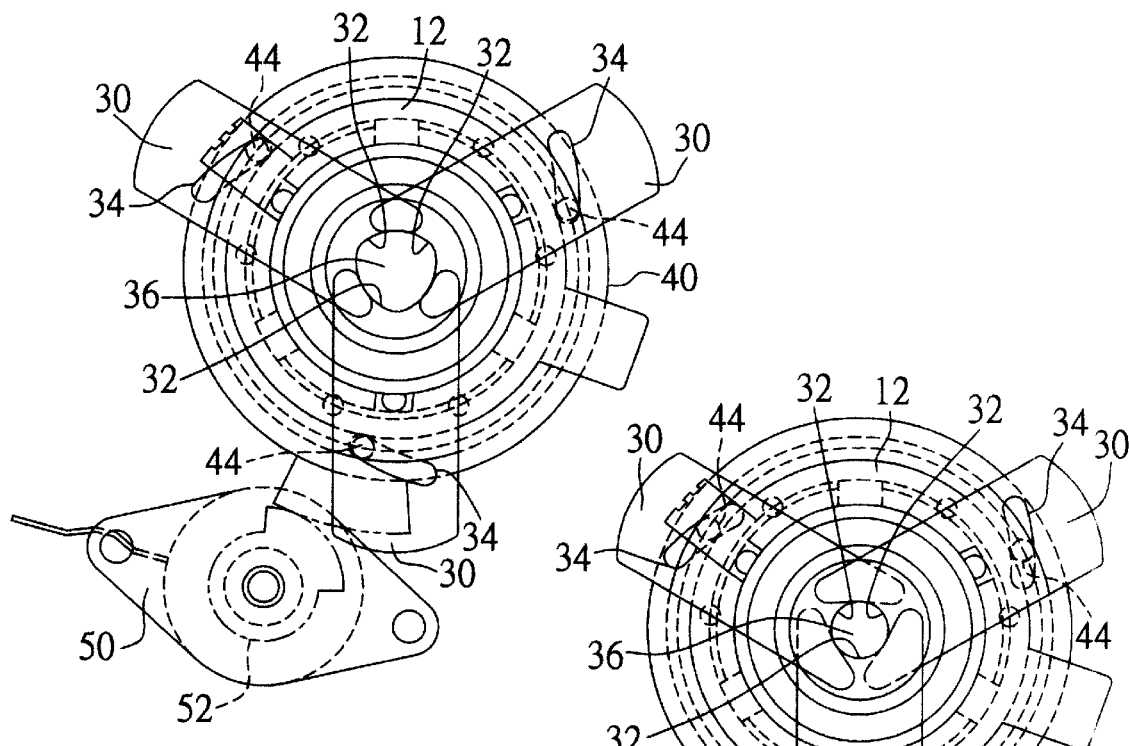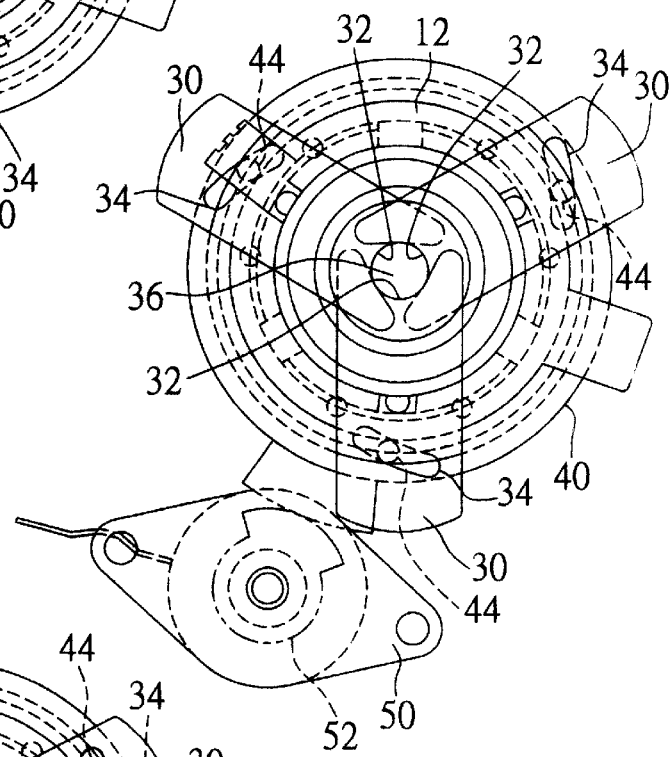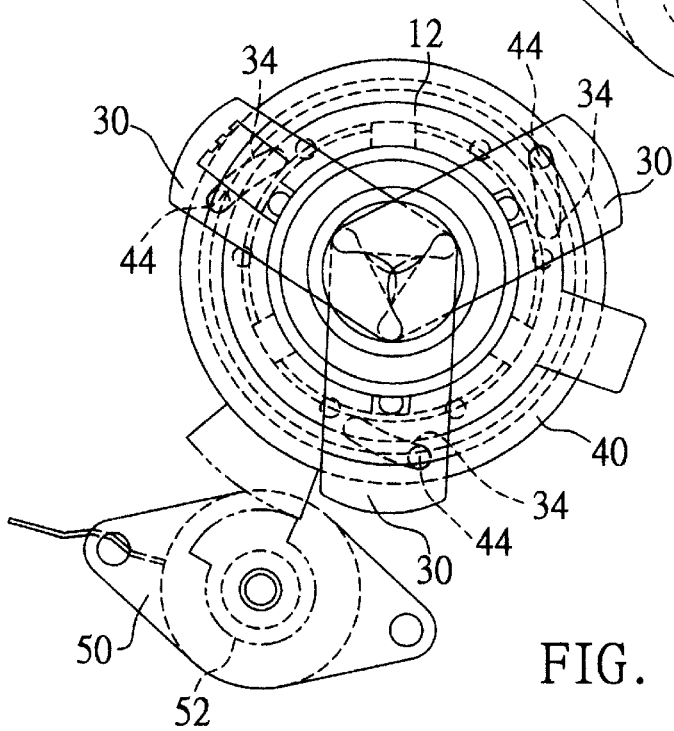
FIG. 6A
FIG. 6B
FIG. 6C

MULTI-BLADE LENS-APERTURE CONTROL MECHANISM

BACKGROUND OF THE INVENTION

1. Field of the Invention

This invention relates to lens technology, and more particularly, to a lens-aperture control mechanism for use in a lens unit, such as a camera lens, to control the aperture of the lens unit.

2. Description of Related Art

An aperture is a variable opening in a camera lens that controls the amount of light passing through the camera lens to the film. A lens-aperture control mechanism is typically mounted inside the lens barrel, but it can also be mounted at the front or rear end of the lens. FIG. 1 is a schematic perspective view of a camera lens 100 which is incorporated with a single-piece aperture device. As shown, the barrel of the camera lens 100 is formed with an insertion slot 102 which allows a flat single-piece aperture device 200 formed with a number of variably-dimensioned openings 202 to be inserted therein. The single-piece aperture device 200 can be adjusted in position so as to allow one of the openings 202 to be used as the aperture for the camera lens 100. One drawback to this single-piece aperture device 200, however, is that the aperture can be only selected from the two fixed openings 202, and cannot be fine tuned.

FIG. 2 is a schematic diagram showing a conventional two-blade aperture device. As shown, this aperture device includes a pair of blades 210 which can be controllably moved toward or away from each other to allow a controlled amount of light to pass through the space between these two blades 210. This aperture device allows the aperture to be fine tuned to any desired value. One drawback to this aperture device, however, is that the square shape of the aperture would cause the image formed by the light passing this aperture to be unevenly illuminated, particularly at the edge portions of the image.

A conventional lens-aperture control mechanism that can provide a near-circular aperture is the so-called iris diaphragm, which is depicted in reference to FIGS. 3A, 3B, and 3C. As shown in FIG. 3A, the iris diaphragm includes a rotatable ring 212 and a plurality of blades 214. The rotatable ring 212 is formed with a plurality of radial slots 213 spaced at equal angular intervals around the rotatable ring 212. Each of the blades 214 has a first end formed with a pivot 217 and a second end formed with a peg 218 slidably fitted to one of the radial slots 213 in the rotatable ring 212. When the rotatable ring 212 is being rotated, each blade 214 will be pivotally moved, causing the peg 218 to be shifted along a route indicated by the reference letter T. As shown in FIG. 3B, the pivot 217 is fixedly formed on a nonrotatable ring 216, and the plurality of blades 214 are arranged in a circular manner to define an aperture 220 whose diameter can be variably adjusted simply by rotating the rotatable ring 212 with respect to the nonrotatable ring 216. As shown in FIG. 3C, the foregoing iris diaphragm is mounted between a front lens group 112 and a rear lens group 114 inside a lens unit 110 so as to control the amount of light passing through the front lens group 112 and the rear lens group 114 to the film (not shown). The rotatable ring 212 can be driven by a motor (not shown) via the transmission through a gear 219 meshed to the rotatable ring 212.

The foregoing iris diaphragm has the benefit of flexible control over the lens aperture. One drawback to it, however, is that it is quite complex in mechanical construction, which would lead to a high manufacture cost. Moreover, since the iris diaphragm is mounted between a front lens group 112 and a rear lens group 114, it would be difficult for the two lens groups 112, 114 to be precisely aligned along an optical axis.

SUMMARY OF THE INVENTION

It is therefore an objective of this invention to provide a lens-aperture control mechanism, which can variably control the lens aperture to the desired value.

It is another objective of this invention to provide a lens-aperture control mechanism, which can provide a near-circular aperture for the lens.

It is still another objective of this invention to provide a lens-aperture control mechanism, which is simple in mechanical construction so that it would be easy to assemble and is thus low in manufacture cost.

In accordance with the foregoing and other objectives of this invention, an improved lens-aperture control mechanism is provided. The lens-aperture control mechanism of the invention includes the following constituent parts: (a) a plurality of blades, each being movable radially inward into the lens barrel and outward from the lens barrel through a plurality of insertion slots formed around the lens barrel; (b) a rotatable ring coupled to the blades, capable of urging the blades to move radially inward into the lens barrel when being turned in a first direction and outward from the lens barrel when being turned in a second direction; and (c) a power driver, coupled to the rotatable ring, for driving the rotatable ring to turn in a specified direction at a specified angular displacement so as to move the blades to a specific radial position, thereby defining a specific aperture for the lens unit.

In the foregoing lens-aperture control mechanism, the blades are each formed with a guide slot oriented in an angled direction in reference to the radial direction of the lens barrel; and correspondingly, the rotatable ring is formed with a plurality of pegs, each being fittable to the guide slot in each of the blades, allowing the pegs to urge the blades to move radially inward into the lens barrel or outward from the lens barrel when the rotatable ring is being turned.

The insertion slots are each oriented in an inclined manner with respect to the cross section of the lens barrel. The rotatable ring is formed with a toothed portion on the periphery thereof, wherein the power driver includes a motor having a shaft; and transmission means coupled between the rotatable ring and the shaft of the motor, for transmitting the motor power to the rotatable ring. The transmission means includes a gear coupled axially to the shaft of the motor and a toothed portion on the rotatable ring.

The insertion slots are formed substantially at equal angular intervals around the lens barrel. The inner end of each of the blades is formed in a concave shape or a curved haft-cutaway portion. When combined, the inner ends of the blades can define a near-circular aperture for the lens unit.

The foregoing lens-aperture control mechanism of the invention can variably control the lens aperture to the desired value and can provide a near-circular aperture for the lens. Moreover, the lens-aperture control mechanism of the invention is simple in mechanical construction so that it would be easy to assemble and is thus low in manufacture cost.

BRIEF DESCRIPTION OF THE DRAWINGS

The invention can be more fully understood by reading the following detailed description of the preferred embodiments, with reference made to the accompanying drawings, wherein:

FIG. 6A is a sectional view of the lens-aperture control mechanism of the invention when the aperture is fully opened;

FIG. 6B is a sectional view of the lens-aperture control mechanism of the invention when the aperture is half opened;

FIG. 6C is a sectional view of the lens-aperture control mechanism of the invention when the aperture is fully closed;

DETAILED DESCRIPTION OF PREFERRED EMBODIMENTS

Figure 1:
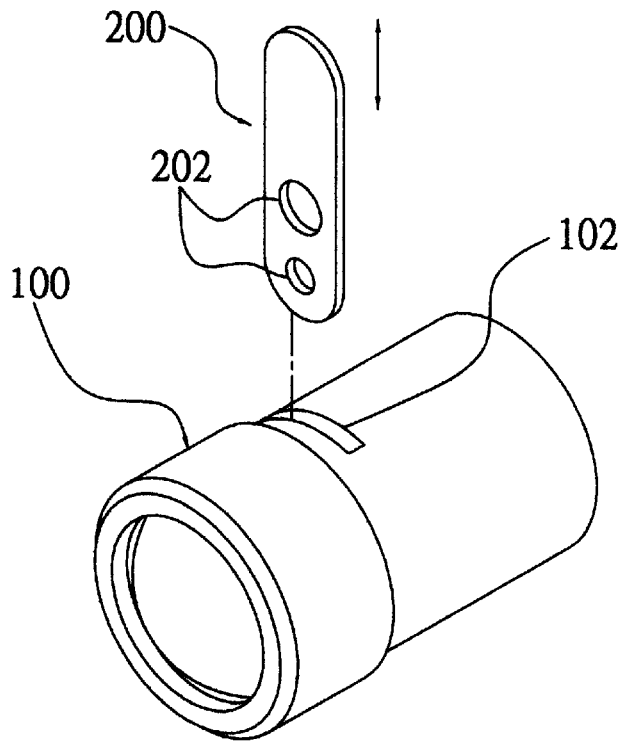
FIG. 1 is a schematic perspective view of a camera lens with a single-piece aperture device.
Figure 2:
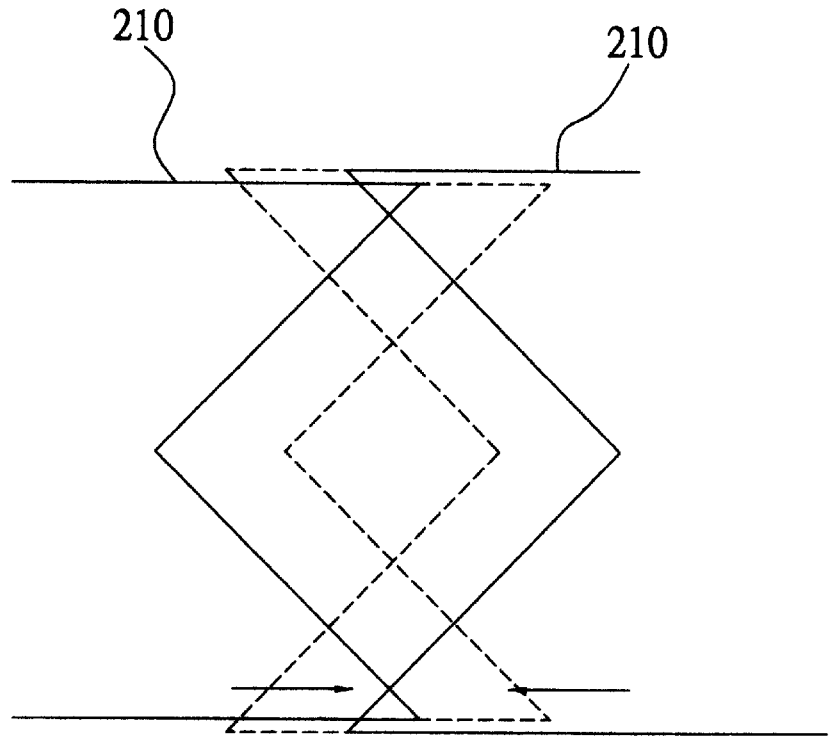
FIG. 2 is a schematic diagram showing a conventional two-blade aperture device.
Figure 3A:
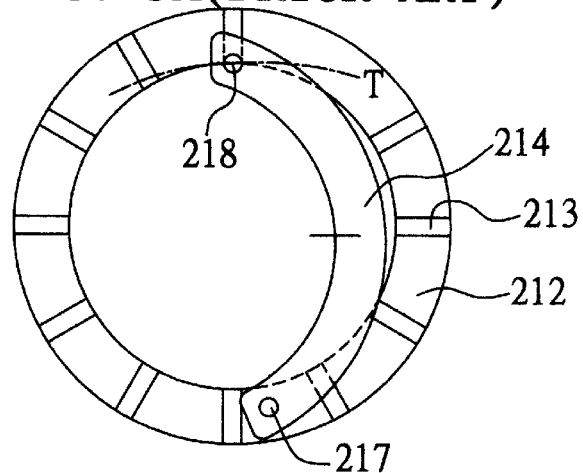
FIG. 3A is a schematic sectional view of part of a conventional iris diaphragm, showing the interaction between the rotatable ring and one blade.
Figure 3B:
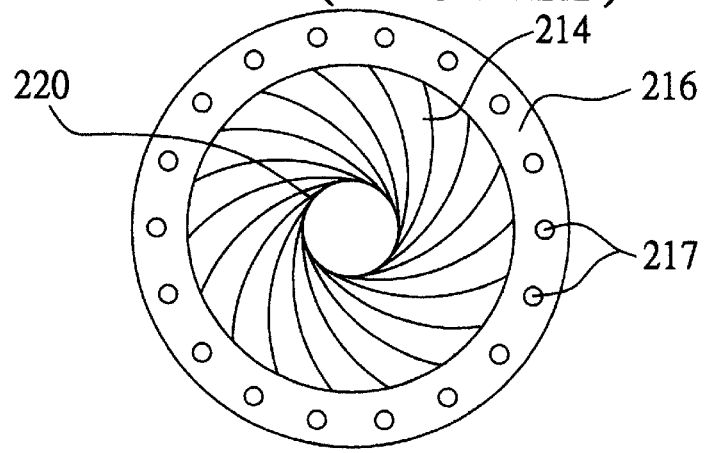
FIG. 3B is a schematic sectional view of the conventional iris diaphragm of FIG. 3A, particularly used to show the forming of an aperture by the blades.
Figure 3C:
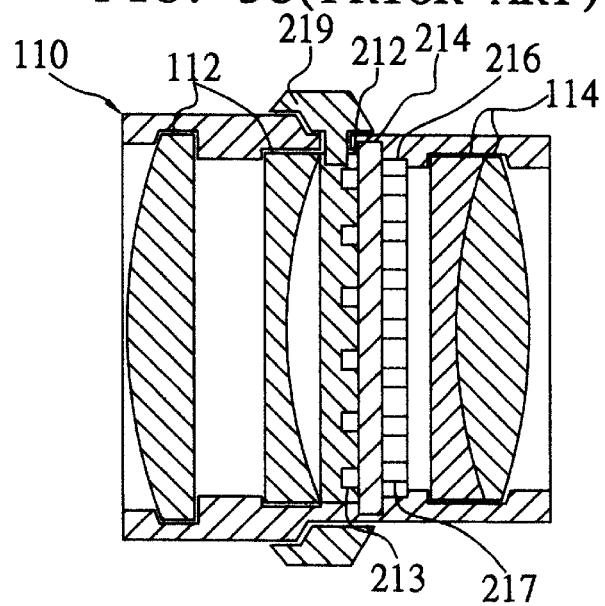
FIG. 3C is a schematic side view of the mounting of the conventional iris diaphragm of FIG. 3A inside a lens unit.
Figure 4:
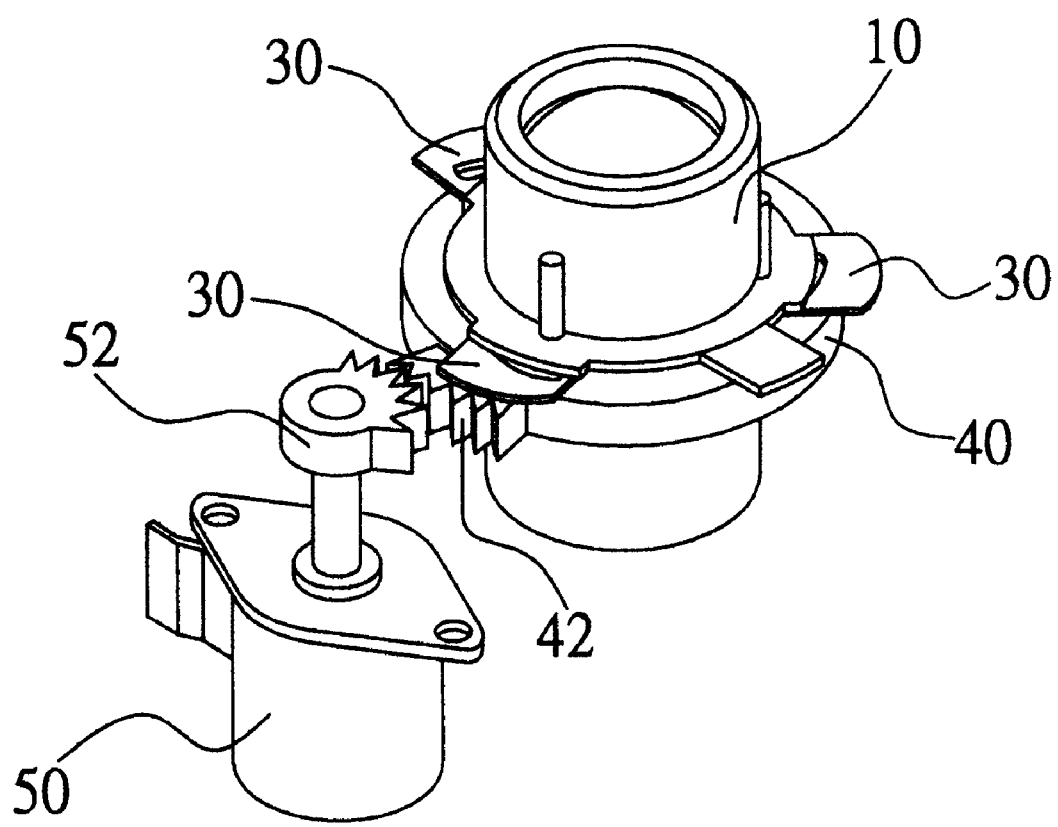
FIG. 4 is a schematic perspective view of a lens unit which is incorporated with the lens-aperture control mechanism of the invention.

FIG. 4 is a schematic perspective view of a lens unit 10 which is incorporated with the lens-aperture control mechanism of the invention. As shown, the lens-aperture control mechanism of the invention includes a set of three blades 30; a rotatable ring 40, and a motor 50 whose shaft is axially coupled to a gear 52. The rotatable ring 40 is formed with a toothed portion 42 meshed to the gear 52 so that the rotatable ring 40 can be driven by the motor 50. The motor 50 can be a step motor or a servo motor, and is used to drive the rotatable ring 40 to turn within a predefined angular range so as to adjust the diameter of the aperture defined by the blades 30.

Figure 5:
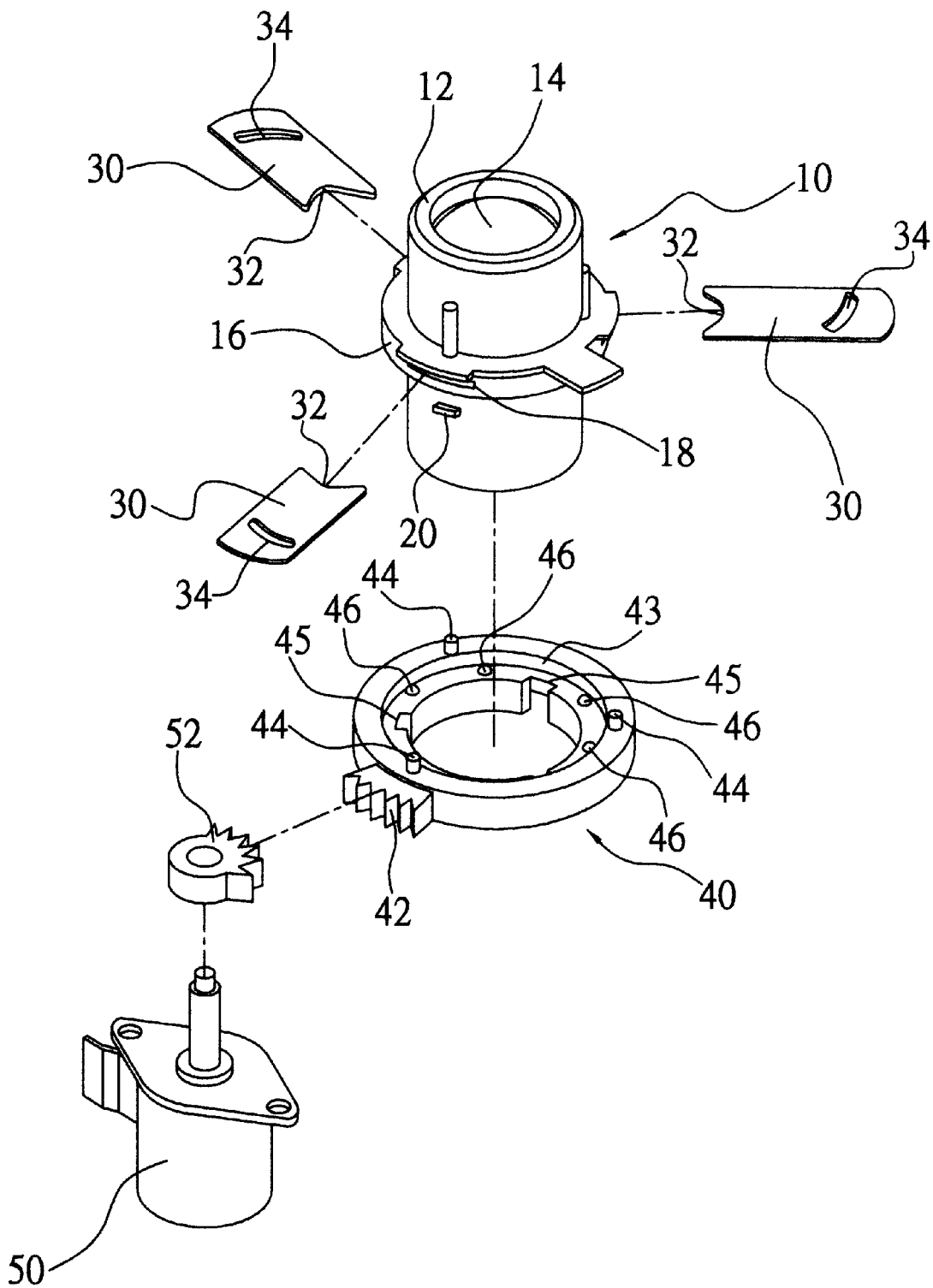
FIG. 5 is an exploded perspective view of the lens-aperture control mechanism of the invention.
Figure 8:
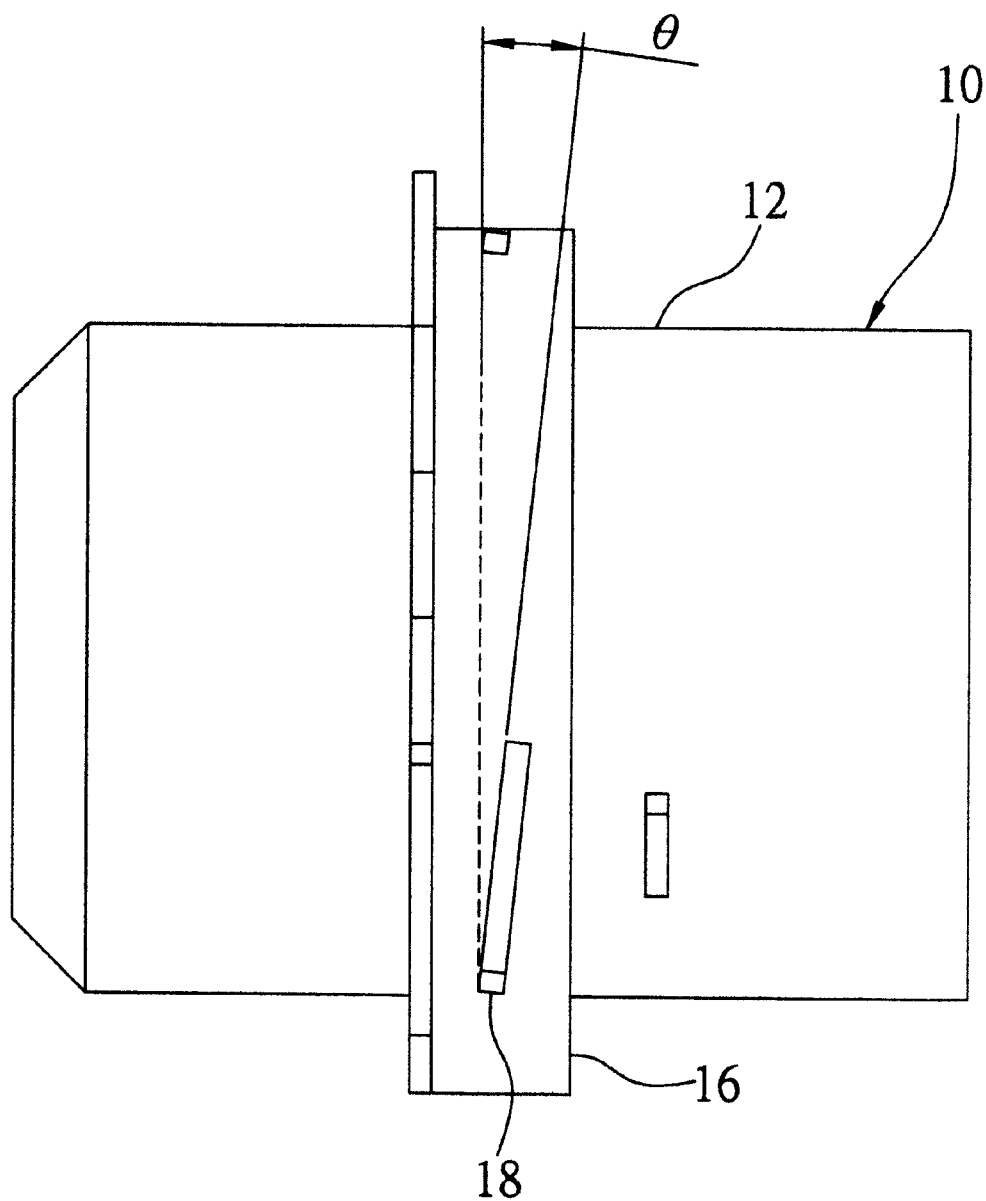
FIG. 8 is a schematic side view of the lens-aperture control mechanism of the invention, particularly used to show the inclined orientation of one insertion slot formed around the lens barrel.

FIG. 5 is an exploded perspective view of the lens-aperture control mechanism of the invention, which is used to show the constituent parts of the lens-aperture control mechanism of the invention. As shown, the lens unit 10 includes a barrel 12 and a lens group 14 mounted in the lens barrel 12. The lens barrel 12 is formed with a collar 16 around its middle section and a plurality of tongues 20 near the collar 16. The collar 16 is formed with three insertion slots 18 in the angular direction and is substantially equally-spaced around the lens barrel 12. Moreover, as illustrated in FIG. 8, the extended directions of these insertion slots 18 is inclined by a specific angle θ with respect to the cross section of the lens barrel 12. This allows the three blades 30, when mounted in position in the insertion slots 18, to not impede each other's movement.

The blades 30 can be made of either metal or plastics. Each of the blades 30 is formed with an inclined guide slot 34 and has a concave inner end 32 for use to fit into one of the insertion slots 18 in the collar 16 around the lens barrel 12. When the three blades 30 are mounted in position, an aperture 36 is defined by the concave inner ends 32 of the three blades 30, as illustrated in FIG. 6A.

As shown in FIG. 5, the rotatable ring 40 is fitted to the outer side of the lens barrel 12. The rotatable ring 40 is formed with a shoulder portion 43 on the inner wall thereof, and a plurality of lumps 46 are formed substantially at equal angular intervals on the shoulder portion 43. Further, a plurality of pegs 44 are formed substantially at equal angular intervals on the top side of the rotatable ring 40. Moreover, a plurality of slots 45 are formed in the inner wall of the rotatable ring 40. These slots 45 are used to be fitted to the tongues 20 on the lens barrel 12.

In the assembly shown in FIGS. 5 and 6, the blades 30 are mounted to the respective insertion slots 18 in the collar 16 on the lens barrel 12. Next, in FIG. 5 the tongues 20 on the lens barrel 12 are fitted to the respective slots 45 in the rotatable ring 40 until the collar 16 on the lens barrel 12 is fitted to the shoulder portion 43 in the rotatable ring 40, whereby the lens unit 10 is coupled to the rotatable ring 40. When fitted in position, the collar 16 on the lens barrel 12 is abutted on the lumps 46 on the shoulder portion 43, which can help reduce the friction between the rotatable ring 40 and the lens unit 10 when the rotatable ring 40 is being turned around the lens unit 10. Next, the rotatable ring 40 is turned until the pegs 44 are fitted to the guide slot 34 in the blades 30. At this position, the tongues 20 can help prevent the rotatable ring 40 from being uncoupled from the lens unit 10.

FIG. 6A is a sectional view of the lens-aperture control mechanism of the invention when the aperture 36 defined by the blades 30 is fully opened to provide the maximum aperture value. As shown, the aperture 36 can be varied in dimension by using the motor 50 to turn the rotatable ring 40 by a specified angular displacement, causing the blades 30 to be moved radially inward or outward with respect to the lens barrel 12 due to the movement of the pegs 44 along the guide slot 34, as illustrated in FIG. 6B. The minimum aperture value is provided when the pegs 44 meet the outer ends of the insertion slots 18 in the blades 30, in which position the blades 30 are moved into the lens barrel 12 to the maximum extent, as illustrated in FIG. 6C.

Figure 7A:
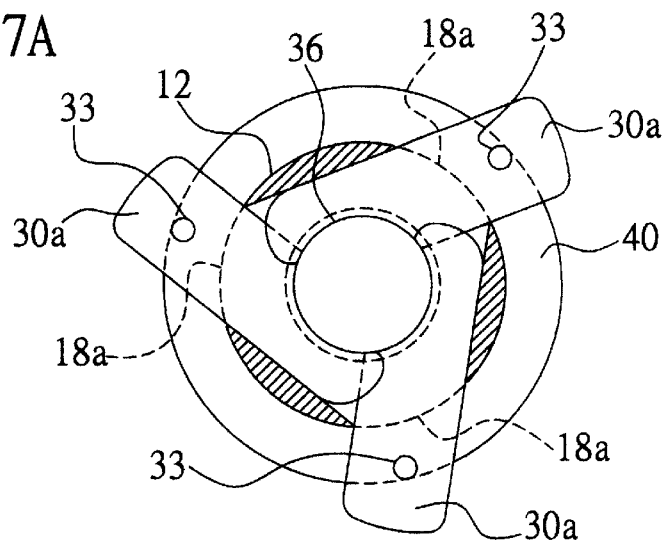
FIG. 7A is a sectional view of another embodiment of the lens-aperture control mechanism of the invention when the aperture is fully opened.
Figure 7B:
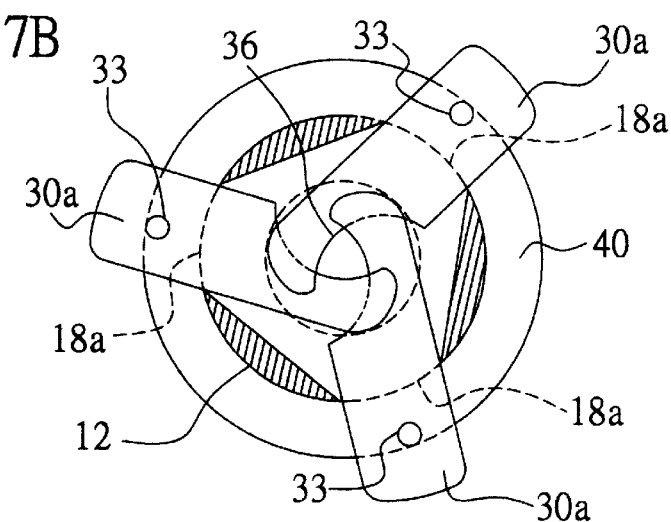
FIG. 7B is a sectional view of another embodiment of the lens-aperture control mechanism of the invention when the aperture is half opened.
Figure 7C:
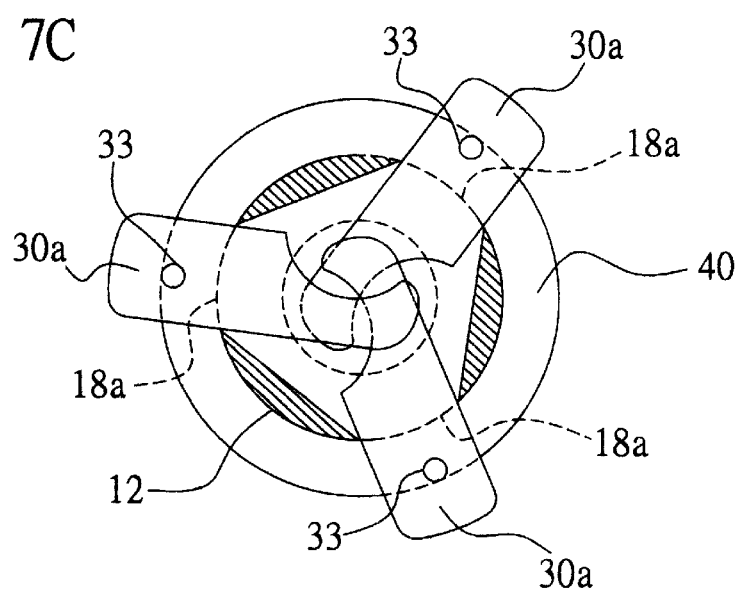
FIG. 7C is a sectional view of another embodiment of the lens-aperture control mechanism of the invention when the aperture is fully closed.

FIGS. 7A–7C show another embodiment of the lens-aperture control mechanism of the invention. In these figures, identical constituent parts are labeled with the same reference numerals. As shown, this embodiment provides three blades 30a, each being pivotably movable about a pivot 33 along an insertion slot 18a. Moreover, the inner end of each of the blades 30a is formed with a curved haft-cutaway portion 36. The blades 30a can be pivotally moved so as to allow the curved haft-cutaway portion 36 thereof to form an aperture. FIG. 7A shows the aperture being fully opened; FIG. 7B shows the aperture being half opened; and FIG. 7C shows the aperture being fully closed.

In conclusion, the lens-aperture control mechanism of the invention has the following advantages over the prior art.

First, the lens-aperture control mechanism of the invention allows the lens aperture to be variably controlled simply by turning the rotatable ring 40 by a predetermined angular displacement to thereby change the radial position of the blades 30.

Second, the invention can provide a near-circular aperture to the lens unit 10, which is defined by the concave inner end 32 of the blades 30. The image formed by the light passing through the aperture can thus be more evenly illuminated.

Third, the lens-aperture control mechanism of the invention is simple in mechanical construction and is therefore easy to assemble. Moreover, in the mounting of the lens-aperture control mechanism, there is no need to separate the lenses in the lens unit into separate groups that would cause optical axis alignment to be difficult as in the case of the prior art. The invention is thus easy to assembly and can help reduce manufacture cost.

Moreover, it is to be noted that the foregoing preferred embodiments are not intended to limit the scope of the invention. For example, the number of the blades is not limited to three, and can be four or more, so as to allow the resultant aperture to be more close to a perfect circle. However, an increase in the blade number would also require the addition of more slots and pegs to accommodate the increased number of blades, and therefore would make the mechanical construction more complex.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A lens-aperture control mechanism for use on a lens unit having a one-piece lens barrel, comprising:

a plurality of blades, wherein each of the blades includes a guide slot formed therein that is oriented in an angled direction with respect to a radial direction of the one-piece lens barrel;

a single rotatable ring fitted to an outer side of the one-piece lens barrel and formed with a plurality of pegs, wherein the pegs fit into the respective guide slots in each of the blades, wherein rotation of the rotatable ring in a first direction allows the pegs to urge the blades to move radially inward into the lens barrel and rotation of the rotatable ring in a second direction opposite the first direction allows the pegs to urge the blades to move radially outward from the lens barrel; and a power driver, coupled to the rotatable ring, for driving the rotatable ring to turn in a specified direction by a specified angular displacement so as to move the blades to a specific radial position to define a specific aperture for the lens unit.

2. The lens-aperture control mechanism of claim 1, wherein the one-piece lens barrel includes a plurality of insertion slots defined therein such that each blade of the plurality of blades fits into a respective insertion slot of the plurality of insertion slots, wherein the insertion slots are each oriented in an inclined manner with respect to an axial direction of the one-piece lens barrel.

3. The lens-aperture control mechanism of claim 1, wherein the rotatable ring is formed with a toothed portion on a periphery thereof; and wherein the power driver includes:

a motor having a shaft; and transmission means coupled between the rotatable ring and the shaft, for transmitting power to the rotatable ring.

4. The lens-aperture control mechanism of claim 3, wherein the transmission means includes a gear coupled axially to the shaft of the motor and a toothed portion on the rotatable ring.

5. The lens-aperture control mechanism of claim 1, wherein the one-piece lens barrel includes a plurality of insertion slots defined therein such that each blade of the plurality of blades fits into a respective insertion slot of the plurality of insertion slots, wherein the insertion slots are formed substantially at equal angular intervals around the one-piece lens barrel.

6. The lens-aperture control mechanism of claim 1, wherein an inner end of each of the blades is formed in a concave shape.

7. The lens-aperture control mechanism of claim 1, wherein an inner end of each of the blades is formed in a curved haft-cutaway portion.

* * * * *